(12) United States Patent
Kawai et al.

(10) Patent No.: US 11,381,128 B2
(45) Date of Patent: Jul. 5, 2022

(54) STATOR WITH EXTERIOR MEMBERS OVER MOLDED COILS

(71) Applicant: FANUC CORPORATION, Yamanashi (JP)

(72) Inventors: Kenji Kawai, Yamanashi-ken (JP); Tatsuya Ooi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 184 days.

(21) Appl. No.: 16/874,080

(22) Filed: May 14, 2020

(65) Prior Publication Data

US 2020/0373802 A1 Nov. 26, 2020

(30) Foreign Application Priority Data

May 21, 2019 (JP) .............................. JP2019-094971

(51) Int. Cl.
*H02K 3/38* (2006.01)
*H02K 3/40* (2006.01)

(52) U.S. Cl.
CPC ..................................... *H02K 3/40* (2013.01)

(58) Field of Classification Search
CPC .. H02K 3/40; H02K 3/32; H02K 3/38; H02K 3/50; H02K 15/12; H02K 15/125
USPC ................. 310/196, 43, 254.1, 260
See application file for complete search history.

(56) References Cited

U.S. PATENT DOCUMENTS

| | | | | |
|---|---|---|---|---|
| 6,040,647 | A * | 3/2000 | Brown | H02K 15/16 29/596 |
| 7,786,635 | B2 * | 8/2010 | Gasser | H02K 15/12 310/43 |
| 9,000,630 | B2 * | 4/2015 | Tsutsui | H02K 3/38 310/260 |
| 2017/0250586 | A1 * | 8/2017 | Katsuki | H02K 5/207 |
| 2017/0302122 | A1 * | 10/2017 | Kobayashi | H02K 5/10 |

FOREIGN PATENT DOCUMENTS

JP 05-328655 A 12/1993
JP 2014-050185 A 3/2014

* cited by examiner

*Primary Examiner* — Michael Andrews
(74) *Attorney, Agent, or Firm* — Robert P. Michal, Esq.; Carter, DeLuca & Farrell LLP

(57) ABSTRACT

A stator includes first exterior members that surround sides of outer circumferential portions of coil ends on both end sides of an iron core, second exterior members connected to the first exterior members, and which surround sides of end portions of the coil ends in the axial direction, and mold members that cover the coil ends and are placed in contact with the first exterior members and the second exterior members. Holes are formed in the second exterior member on one end side, and a surface that faces the mold member, of the second exterior member on the one end side, is inclined in a manner so that a thickness thereof becomes continuously thinner toward the holes.

3 Claims, 3 Drawing Sheets

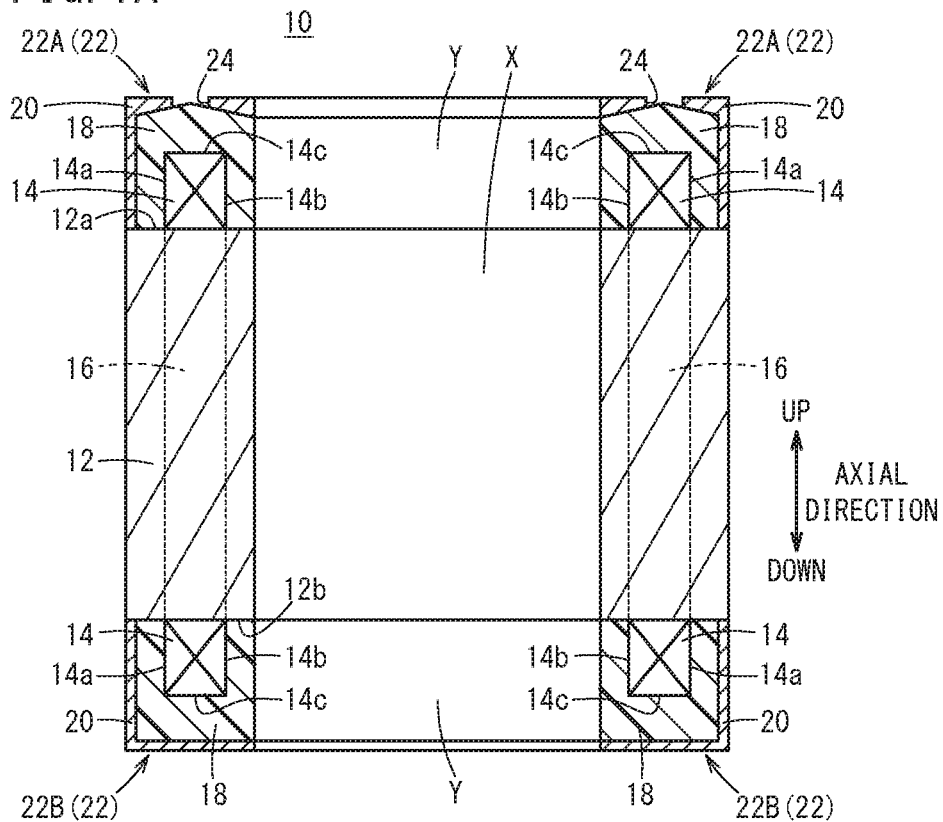
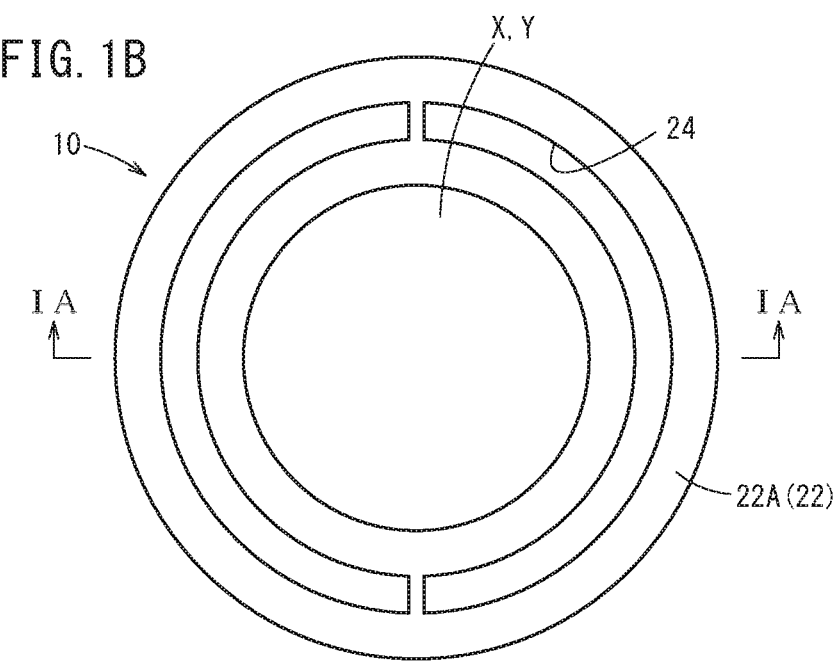

STATOR WITH EXTERIOR MEMBERS OVER MOLDED COILS

CROSS-REFERENCE TO RELATED APPLICATION

This application is based upon and claims the benefit of priority from Japanese Patent Application No. 2019-094971 filed on May 21, 2019, the contents of which are incorporated herein by reference.

BACKGROUND OF THE INVENTION

Field of the Invention

The present invention relates to a stator in which voids in a mold member are reduced.

Description of the Related Art

In Japanese Laid-Open Patent Publication No. 2014-050185, filling of a mold resin (mold member) into a space formed by a casing 1 and an end member 7 is disclosed. A stator having a configuration in which a coil is filled with the mold member in this manner is also referred to as a "resin molded stator".

SUMMARY OF THE INVENTION

From the standpoint of improving the quality of the stator, and in order to suppress the occurrence of unintended abnormalities such as corona discharge, ideally, air bubbles are not contained in the mold member that is filled in the coil. Such air bubbles are also referred to as "voids". However, in the resin molded stator disclosed in Japanese Laid-Open Patent Publication No. 2014-050185, since the end member 7 is a flat surface, when the space is filled with the mold member, air becomes disadvantageously trapped in corners of the aforementioned space. Accordingly, with the configuration disclosed in Japanese Laid-Open Patent Publication No. 2014-050185, it is not possible to suppress the occurrence of voids during manufacturing.

Thus, the present invention has the object of providing a stator in which voids in a mold member are reduced.

One aspect of the present invention is characterized by a stator which is possessed by an electric motor, the stator including an iron core, a coil disposed in the iron core so as to include coil ends respectively on both of end sides of the iron core in an axial direction of the electric motor, first exterior members provided so as to surround sides of outer circumferential portions of the coil ends respectively on both of the end sides, second exterior members connected to the first exterior members and provided so as to surround sides of end portions of the coil ends in the axial direction respectively on both of the end sides, and mold members configured to cover the coil ends, and which are placed in contact with the first exterior members and the second exterior members respectively on both of the end sides, wherein a hole configured to penetrate through the second exterior member is formed in the second exterior member on one end side of both of the end sides, and a surface that faces the mold member, of the second exterior member on the one end side, is inclined in a manner so that a thickness of the second exterior member on the one end side becomes continuously thinner toward the hole.

According to the present invention, a stator is provided in which voids in the mold member are reduced.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 1A is a cross-sectional view of a stator according to an embodiment of the present invention;

FIG. 1B is a top view of the stator;

DESCRIPTION OF THE PREFERRED EMBODIMENTS

Figure 2:
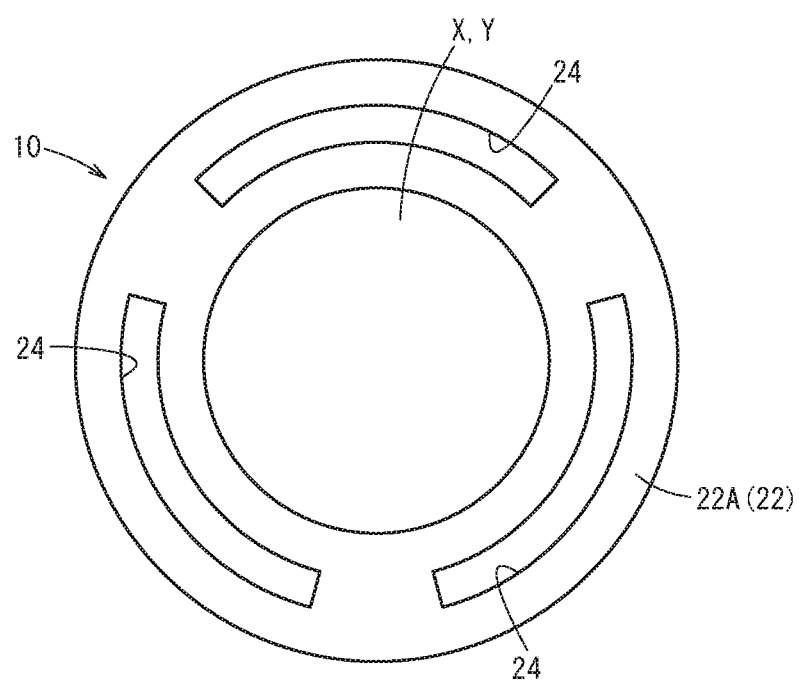
FIG. 2 is a top view of the stator according to a first modification.

Hereinafter, a preferred embodiment of the present invention will be presented and described in detail below with reference to the accompanying drawings. It should be noted that the respective directions described below conform to the arrows shown in each of the drawings.

Embodiment

FIG. 1A is a cross-sectional view of a stator 10 according to an embodiment of the present invention. FIG. 1B is a top view of the stator 10. Moreover, FIG. 1A is a cross-sectional view taken along line IA-IA of FIG. 1B.

The stator 10 according to the present embodiment is one of the components that make up the electric motor together with a rotor and a shaft. The stator 10 is equipped with an iron core 12, a coil 16 provided in the iron core 12 in a manner so as to include coil ends 14 at respective both end sides 12a and 12b of the iron core 12 in an axial direction (vertical direction) of the electric motor, and mold members 18 with which the coil ends 14 are covered. The "axial direction" referred to above a direction along the longitudinal direction of a shaft that serves as a rotating main shaft of the electric motor.

In the present embodiment, the shape of the iron core 12 is a cylindrical shape having a shaft hole X that penetrates through the iron core 12 in the axial direction. A rotor and a shaft of the above-described electric motor are arranged in the shaft hole X. Moreover, as long as it is generally tubular in shape, the shape of the iron core 12 is not limited to being in the shape of a circular cylinder.

The coil 16 is made of conductive wires. The conductive wires, for example, are enameled wires. The coil ends 14 of the coil 16 include outer circumferential portions 14a, inner circumferential portions 14b, and end portions 14c in the axial direction.

In the electric motor that possesses the stator 10 according to the present embodiment, a current flows in the coil 16 when a torque is generated in the rotor of the electric motor. When the current flows, heat is generated in the coil 16. Such heat is absorbed by the mold members 18 with which the coil ends 14 are covered.

According to the present embodiment, the mold members 18 are members containing an epoxy resin as a material. The mold members 18 do not only cover the surfaces of the outer circumferential portions 14a, the inner circumferential portions 14b, and the end portions 14c of the coil ends 14, but also are filed between different phases of the wires that form the coil ends 14. In this manner, according to the present embodiment, since the contact area between the coil ends 14 and the mold members 18 is sufficiently assured, the heat of the coil 16 can be efficiently absorbed by the mold members 18.

Further, the mold members 18 contain an insulating material such as an epoxy resin. Accordingly, even it a conductive object (for example, metal or the like) exists in the vicinity of the coil 16 and the mold members 18, unintended contact and the occurrence of short circuiting between the conductive object and the coil 16 can be prevented. Consequently, the reliability of an electric 1b motor having the stator 10 according to the present embodiment is improved.

It should be noted that the material of the mold members 18 is not necessarily limited to the material described above. For example, the material of the mold members 18 may include a resin other than an epoxy. Alternatively, the mold members 18 may include a filler in addition to the resin. The filler, for example, is alumina (aluminum oxide). By including alumina, the thermal conductivity of the mold members 18 is improved.

The stator 10 further comprises first exterior members 20 and second exterior members 22, which are provided so as to surround the coil ends 14 on both of the end sides 12a and 12b. As shown in FIG. 1A, the first exterior members 20 are members in contact with the iron core 12, and which are provided so as to surround the coil ends 14 and the mold members 18 from the side of the outer circumferential portions 14a. According to the present embodiment, the first exterior members 20 are made of an alloy that contains aluminum.

As shown in FIG. 1A, the second exterior members 22 are members provided so as to surround the coil ends 14 and the mold members 18 from the side of the end portions 14c. The first exterior members 20 and the second exterior members 22 may be configured as one member in which they are integrally connected to each other, or may be configured as separate members that are separated from each other. In the present embodiment, as shown in FIG. 1A, a description will be given assuming that the first exterior members 20 and the second exterior members 22 are integrally connected. The shape of the second exterior members 22 is an annular shape having exterior shaft holes X that penetrate through the second exterior members 22 in the axial direction, in a manner so as not to hinder the arrangement of the rotor and the shaft in the shaft hole X of the iron core 12. Similar to the first exterior members 20, according to the present embodiment, the second exterior members 22 are made of an alloy that contains aluminum. Hereinafter, in order to distinguish them from each other, the second exterior member 22 on the one end side 12a (upward side) of both of the ends 12a and 12b may be referred to as a "second exterior member 22A", and the second exterior member 22 on the other end side 12b (lower side) may be referred to as a "second exterior member 22B".

Holes 24 that penetrate through the second exterior member 22A in the axial direction are formed in the second exterior member 22A more on an upper side than the iron core 12, and at positions that differ from the exterior shaft hole Y. In addition, the surface of the second exterior member 22A that faces the mold member 18 is inclined in a manner so that the thickness of the second exterior member 22A becomes thinner continuously toward the holes 24. As shown in FIG. 1B, at least two holes 24 are formed in the shape of arches when viewed from the upper side. It should be noted that the shapes of the holes 24 when viewed from the upper side are not limited to that shown in FIG. 1F, and may be changed as appropriate.

As shown in FIG. 1A, the first exterior members 20 and the second exterior members 22 are placed in close contact with the mold members 18 with which the coil ends 14 are covered. Consequently, the first exterior members 20 and the second exterior members 22 absorb the heat of the mold members 18. Further, the first exterior members 20 and the second exterior members 22 release the absorbed heat into the ambient air. By doing so, according to the present embodiment, the heat of the coil 16 is released externally of the stator 10.

As is generally well known, the thermal conductivity of aluminum is greater than or equal to the thermal conductivity of an epoxy resin. Accordingly, the first exterior members 20 and the second exterior members 22 are capable of efficiently absorbing the heat of the mold members 18.

The material of the first exterior members 20 and the second exterior members 22 need not necessarily include aluminum. According to the present embodiment, the material of the first exterior members 20 and the second exterior members 22 is an alloy. However, for example, in the case that a metal is used as the material, the material of the first exterior members 20 and the second exterior members 22 need not necessarily be an alloy, and may be made of a single metal. However, from the standpoint of conducting heat as discussed above, the material of the first exterior members 20 and the second exterior members 22 is preferably a material having at least a thermal conductivity that is greater than or equal to that of the mold members 18. Further, although it is ideal in terms of the quality of the stator 10 that the first exterior members 20 and the second exterior members 22 are not in direct contact with the coil ends 14 as shown in FIG. 1A, they may be placed in direct contact with each other.

The overall configuration of the stator 10 of the present embodiment is as described above. In the stator 10, voids in the mold member 18 are reduced. Accordingly, an electric motor possessing the above-described stator 10 suppresses to a minimum the possibility that unintended abnormalities such as corona discharge will occur, and has good reliability.

[Modifications]

While an embodiment has been described as one example of the present invention, it goes without saying that various modifications or improvements can be added thereto. It is apparent from the scope of the claims that embodiments to which such modifications or improvements have been added can be included within the technical scope of the present invention.

(Modification 1)

FIG. 2 is a top view of the stator 10 according to a first modification (Modification 1).

It has been described according to the embodiment that the number of holes 24 is not limited to two. The present modification illustrates a specific example of this feature. For example, as shown in FIG. 2, three holes 24 may be formed in the second exterior member 22A. Further, the present modification is not limited to the configuration shown in FIG. 2, and for example, four or more holes 24 may be formed in the second exterior member 22A.

(Modification 2)

Figure 3:
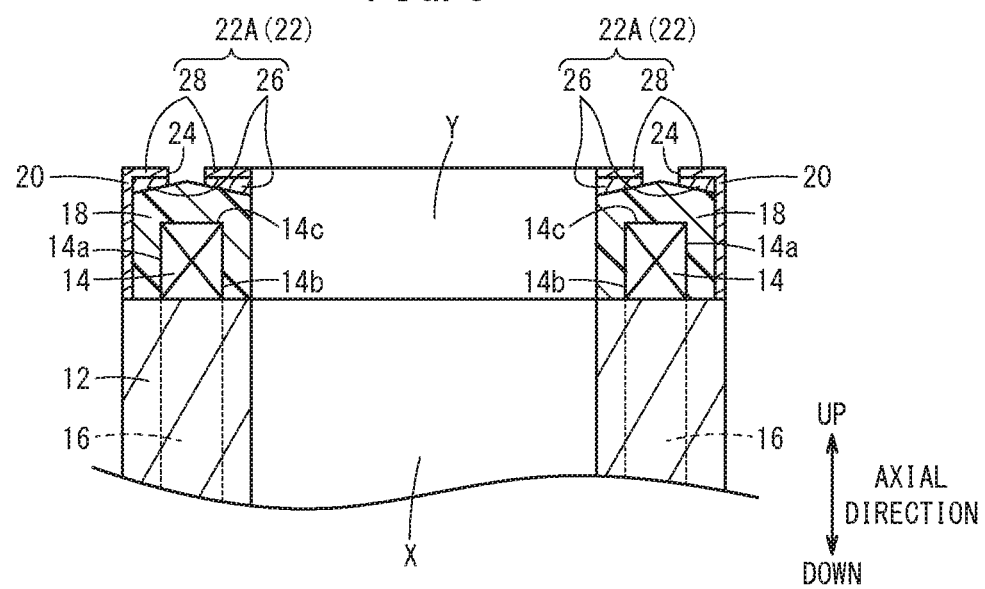
FIG. 3 is a cross-sectional view of the stator according to a second modification.

FIG. 3 is a cross-sectional view of the stator 10 according to a second modification (Modification 2).

The second exterior member 22A may be configured by stacking a plurality of members. For example, as shown in FIG. 3, the second exterior member 22A may include an inside member 26 in contact with the mold member 18, and an outside member 28 that is stacked on the inside member 26 on a side opposite to the mold member 18. In this case, the holes 24 that are formed in the second exterior member 22A allow communication between the inside member 26 and the outside member 28.

According to the present modification, if the surface of the inside member 26 that faces the mold member 18 is inclined in a manner so that the thickness of the inside member 26 becomes thinner toward the holes 24, the surface of the outside member 28 need not necessarily be inclined. Further, assuming that the outside member 28 is connected to the first exterior member 20, the inside member 26 need not necessarily be connected to the first exterior member 20. Moreover, the present modification is not limited to the configuration shown in FIG. 3, and for example, the second exterior member 22A may include another member that is stacked together with the inside member 26 and the outside member 28.

(Modification 3)

The above-described embodiment and the respective modifications thereof may be appropriately combined within a range in which no technical inconsistencies occur.

[Inventions Obtained from the Embodiment]

Inventions that can be grasped from the above-described embodiment and the modifications thereof will be described below.

The stator (10) which is possessed by the electric motor includes the iron core (12), the coil (16) disposed in the iron core (12) so as to include the coil ends (14) respectively on both of the end sides (12a and 12b) of the iron core (12) in the axial direction of the electric motor, the first exterior members (20) provided so as to surround sides of outer circumferential portions (14a) of the coil ends (14) respectively on both of the end sides (12a and 12b), the second exterior members (22) connected to the first exterior members (20) and provided so as to surround sides of end portions (14c) of the coil ends (14) in the axial direction respectively on both of the end sides (12a and 12b), and the mold members (18) that cover the coil ends (14) and are placed in contact with the first exterior members (20) and the second exterior members (22) respectively on both of the end sides (12a and 12b), wherein the holes (24) that penetrate through the second exterior member (22) are formed in the second exterior member (22) on one end side (12a) of both of the end sides (12a and 12b), and a surface that faces the mold member (18), of the second exterior member (22) on the one end side (12a), is inclined in a manner so that a thickness of the second exterior member (22) on the one end side (12a) becomes continuously thinner toward the holes (24).

In accordance with this feature, the stator (10) is provided in which voids in the mold members (18) are reduced.

The thermal conductivity of the first exterior members (20) and the second exterior members (22) may be greater than or equal to the thermal conductivity of the mold members (18). In accordance with this feature, the first exterior members (20) and the second exterior members are capable of efficiently absorbing the heat of the mold members (18).

The material of the mold members (18) may include an insulating resin. In accordance with this feature, short circuiting due to unintended contact between the coil (16) and the exterior is prevented.

What is claimed is:

1. A stator possessed by an electric motor, the stator comprising:
   an iron core;
   a coil disposed in the iron core so as to include coil ends respectively on both of end sides of the iron core in an axial direction of the electric motor;
   first exterior members provided so as to surround sides of outer circumferential portions of the coil ends respectively on both of the end sides;
   second exterior members connected to the first exterior members and provided so as to surround sides of end portions of the coil ends in the axial direction respectively on both of the end sides; and
   mold members configured to cover the coil ends, and which are placed in contact with the first exterior members and the second exterior members respectively on both of the end sides;
   wherein a hole configured to penetrate through the second exterior member is formed in the second exterior member on one end side of both of the end sides; and
   a surface that faces the mold member, of the second exterior member on the one end side, is inclined in a manner so that a thickness of the second exterior member on the one end side becomes continuously thinner toward the hole, wherein the mold member on the one end side has a portion that extends into the hole.

2. The stator according to claim 1, wherein a thermal conductivity of the first exterior members and the second exterior members is greater than or equal to a thermal conductivity of the mold members.

3. The stator according to claim 1, wherein a material of the mold members includes an insulating resin.

* * * * *